United States Patent
Christenson et al.

(10) Patent No.: US 9,016,628 B2
(45) Date of Patent: Apr. 28, 2015

(54) METHODS AND APPARATUS FOR REDUCING NOISE IN REINFORCED SKIN STRUCTURES

(75) Inventors: Justin Christenson, Everett, WA (US);
Herbert L. Hoffman, Seattle, WA (US);
Gary R. Chewning, Woodinville, WA (US); Juhn-Shyue Lin, Renton, WA (US)

(73) Assignee: The Boeing Company, Chicago, IL (US)

( * ) Notice: Subject to any disclaimer, the term of this patent is extended or adjusted under 35 U.S.C. 154(b) by 123 days.

(21) Appl. No.: 13/494,083

(22) Filed: Jun. 12, 2012

(65) Prior Publication Data

US 2013/0327588 A1      Dec. 12, 2013

(51) Int. Cl.
| | | |
|---|---|---|
| *B64C 1/00* | (2006.01) | |
| *B64C 1/06* | (2006.01) | |
| *F16F 9/30* | (2006.01) | |
| *B64C 1/40* | (2006.01) | |

(52) U.S. Cl.
CPC ............... *B64C 1/064* (2013.01); *F16F 9/306* (2013.01); *B64C 1/061* (2013.01); *B64C 1/40* (2013.01); *Y02T 50/46* (2013.01)

(58) Field of Classification Search
CPC ............. B64C 1/12; B64C 1/064; B64C 1/06; B64C 3/26; B64C 3/182; B64C 1/061; B64C 1/065; B64C 1/40; B64C 1/403; F16F 9/306; B29K 2995/0091; G10K 11/16; G10K 11/172; E04B 1/82; Y02T 50/42; Y02T 50/46
USPC ............... 52/167.7, 167.8, 167.9, 167.3, 843, 52/846, 847, 693, 696; 244/117 R, 119; 181/207, 210, 290, 292
See application file for complete search history.

(56) References Cited

U.S. PATENT DOCUMENTS

| | | | | |
|---|---|---|---|---|
| 1,485,373 | A * | 3/1924 | Dornier ........................... 114/83 |
| 2,152,189 | A * | 3/1939 | Henderson ...................... 52/693 |
| 2,387,219 | A * | 10/1945 | Barnes ....................... 244/117 R |
| 3,078,971 | A * | 2/1963 | Wallerstein, Jr. ............. 52/403.1 |
| 3,103,262 | A * | 9/1963 | Handley ......................... 52/650.1 |
| 3,402,560 | A * | 9/1968 | Staffan .......................... 405/231 |
| 3,601,228 | A * | 8/1971 | Nashif ........................... 188/268 |
| 3,976,269 | A * | 8/1976 | Gupta ............................ 244/119 |

(Continued)

OTHER PUBLICATIONS

Sengupta, S.; Reduction of Cabin Noise During Cruise Conditions by Stringer and Frame Damping; AIAA Journal; Mar. 1979; pp. 229-236; vol. 17, No. 3.

*Primary Examiner* — Robert Canfield
*Assistant Examiner* — Matthew Gitlin
(74) *Attorney, Agent, or Firm* — Armstrong Teasdale LLP (57) ABSTRACT

Assemblies, methods, and an apparatus for damping vibrational energy induced to a reinforced skin structure are disclosed. The reinforced skin structure includes an outer wall and at least one stringer coupled to the outer wall. The method includes providing a damping apparatus that includes a stiffening member configured to adjust at least one of a bending mode and a torsional twisting mode of the stringer and an energy dissipation member configured to dissipate vibrational energy of the stringer. The stiffening member includes at least two elongated members that are spaced a distance apart and at least one truss member that extends obliquely between the at least two elongated members. The damping apparatus is attached to the at least one stringer. The damping apparatus may be configured to dampen vibration in the range of between about 200-600 Hz.

20 Claims, 4 Drawing Sheets

(56) References Cited

U.S. PATENT DOCUMENTS

| | | | |
|---|---|---|---|
| 3,995,080 A * | 11/1976 | Cogburn et al. | 428/34.5 |
| 4,416,349 A | 11/1983 | Jacobs | |
| 4,425,980 A | 1/1984 | Miles | |
| 4,635,882 A * | 1/1987 | SenGupta et al. | 244/119 |
| 4,828,202 A | 5/1989 | Jacobs et al. | |
| 5,165,627 A * | 11/1992 | Amano et al. | 244/119 |
| 5,242,523 A * | 9/1993 | Willden et al. | 156/285 |
| 5,290,973 A * | 3/1994 | Kwoh | 181/199 |
| 5,570,558 A * | 11/1996 | Persson | 296/146.6 |
| 5,858,509 A * | 1/1999 | Polch et al. | 428/166 |
| 5,895,538 A * | 4/1999 | Hatayama et al. | 156/87 |
| 6,779,707 B2 * | 8/2004 | Dracup et al. | 228/112.1 |
| 7,124,982 B2 * | 10/2006 | Brofeldt | 244/119 |
| 8,603,279 B2 * | 12/2013 | Malasse et al. | 156/228 |
| 2009/0194636 A1 * | 8/2009 | Childs | 244/123.8 |
| 2010/0129589 A1 * | 5/2010 | Senibi et al. | 428/71 |
| 2011/0139932 A1 * | 6/2011 | Matheson et al. | 244/132 |
| 2011/0186683 A1 * | 8/2011 | Lonsdorfer et al. | 244/119 |
| 2011/0302870 A1 * | 12/2011 | Sawada | 52/653.1 |
| 2013/0344291 A1 * | 12/2013 | Pearson et al. | 428/157 |

* cited by examiner

METHODS AND APPARATUS FOR REDUCING NOISE IN REINFORCED SKIN STRUCTURES

BACKGROUND

The embodiments described herein relate generally to methods and systems that facilitate reducing noise in reinforced skin structures.

At least some known reinforced skin structures generate noise and vibrations. For example, reinforced structures such as aircraft, trains, automobiles, ships and the like may be subject to self-generated vibration due to a running powerplant, or other noise such as wind and ground noise. For aircraft in particular, noise and vibrations may be generated by the engines, wind effects from the aircraft's aerodynamics, flight loading, and/or other components of the aircraft. The noise and vibrations can propagate about the passenger cabin, such that passenger communication and comfort can be adversely effected. As a result, it is desirable to maintain interior cabin noise levels as low as possible. When weight and size are insignificant factors, wide latitude may be afforded in methods for reducing noise. However, in some environments, such as in aircraft, high power and light weight requirements impart restrictions on the methods one may use to reduce noise and vibration, in comparison to other forms of transportation vehicles and structures.

As described in U.S. Pat. No. 4,635,882, an aircraft structure may be designed such that the fundamental frequency of the skin is higher than the fundamental frequency of the stringers when the aircraft is unpressurized if it is desired to reduce low to mid frequency interior noise during takeoff and during cruise. Such result is achieved by controlling the relationship between stringer spacing and skin thickness so that such frequency relationship exists. However, when the skin fundamental frequency is higher than the fundamental frequency of the stringers, the coupled mode of the structure is a strong radiator of sound because a large section of the skin vibrates in phase. The response of the coupled mode on low to mid frequencies is strongly determined by the deflection of the stringers. Thus, damping the stringers is an effective way of reducing the vibration and noise.

Aircraft cabin noise above 600 Hz may be reduced with skin damping and insulation. However, such noise-reducing methods are generally ineffective for mid-frequency ranges of about 200-600 Hz, which generally occur when pressurized aircraft fuselages are flown at high altitudes. Such mid-frequency ranges may overlap with the resonant frequency of the aircraft fuselage's support members, or stringers, and excite a first bending and/or torsional twisting mode of the stringers, which may undesirably increase or amplify noise and vibrations in the fuselage.

One known method of reducing noise and vibration in an aircraft cabin includes attaching lead blankets to stringers and skin of the aircraft. The lead blankets are effective at absorbing vibrations; however, the lead blankets add substantial amounts of weight, causing inefficient operation of the aircraft, such as increased amounts of fuel consumed.

Another known method of reducing vibration and noise in the mid-frequency ranges in the cabin of an aircraft includes attaching stiffeners and damping materials to the stringers of the fuselage. Known stiffeners are generally either ineffective at reducing noise and vibrations or inefficient for aircraft operation. For example, one known stiffener is fabricated as a solid piece of material that is coupled directly to the flanges of a hat cross-sectional stringer, such that the space between the opposing flanges, defining a U-shape of the stringer, is completely covered. This known stiffener is sometimes referred to as a "full-hat" damper because it fully covers the hat-section of the stringer. However, the full-hat damper is undesirable because it prohibits visual corrosion inspection of the covered portions of the stringer. As such, the full-hat damper is typically applied to a stringer intermittently along certain sections of the stringers, leaving gaps therebetween to enable corrosion inspections to be performed. However, coupling the full-hat damper intermittently along the stringers reduces the effectiveness in constraining the bending and torsional twisting modes of the stringers. Moreover, because the full hat dampers are a solid piece of material, the full hat dampers add undesirable additional weight to the fuselage, resulting in decreased efficiency.

Other known stiffener configurations, such as ladder-shaped stiffeners/dampers that are attachable to a stringer, include square cutouts in the stiffener, such as those described in described in U.S. Pat. No. 4,635,882. However, such ladder-shaped stiffeners that include rectangular cutouts generally provide inadequate torsional twisting stiffness compared to full-hat stiffeners, which can result in resonant coupling of the stringer to the fuselage skin resulting in a failure to effectively transfer vibrational energy to the damping materials. Moreover, the effectiveness of most aircraft stiffeners with cutouts may be limited by structural limitations on the systems. For example, the power and weight requirements of modern aircraft may limit the type of damping material and/or the number of stiffening members that can be installed, which can result in reduced damping effect of these stiffening members.

BRIEF DESCRIPTION

In one aspect, a reinforced skin structure includes an outer wall, at least one stringer coupled to the outer wall and a vibration damping apparatus coupled to the stringer. The vibration damping apparatus includes a stiffening member extending along at least a portion of the at least one stringer. The stiffening member includes at least two elongated members spaced a distance apart and at least one truss member extending obliquely between the at least two elongated members. The stiffening member is configured to adjust at least one of a bending mode and a torsional twisting mode of the stringer. An energy dissipation member is coupled to the stiffening member and is configured to dissipate vibrational energy of the stringer.

In another aspect, a method for damping vibrational energy induced to a reinforced skin structure is disclosed. The reinforced skin structure includes an outer wall and at least one stringer coupled to the outer wall. The method includes providing a damping apparatus that includes a stiffening member configured to adjust at least one of a bending mode and a torsional twisting mode of the stringer and an energy dissipation member configured to dissipate vibrational energy of the stringer. The stiffening member includes at least two elongated members that are spaced a distance apart and at least one truss member that extends obliquely between the at least two elongated members. The damping apparatus is attached to the at least one stringer. The damping apparatus is configured to dampen vibration of the stringer.

In yet another embodiment, an apparatus for damping vibrational energy of a reinforced skin structure includes a stiffening member configured to adjust at least one of a bending mode and a torsional twisting mode of a reinforced skin structure. The stiffening member includes at least two elongated members spaced a distance apart and at least one truss member extending obliquely between said at least two elongated members. An energy dissipation member is coupled to the stiffening member. The energy dissipation member is configured to dissipate vibrational energy of the reinforced skin structure.

In still another aspect, a method of determining a noise reduction property of a damper coupled to a reinforced skin structure comprising an outer skin and at least one stringer coupled to the skin is disclosed. The method includes modeling a damper comprising a stiffening member configured to extend along the at least one stringer. The stiffening member includes at least two elongated members spaced a distance apart and at least one truss member extending obliquely between said at least two elongated members, and an energy dissipation member coupled to said stiffening member. The energy dissipation member is configured to dissipate vibrational energy of the stringer. The model of the damper includes damper data comprising at least one of a stiffness, loss factor, and thickness of the energy dissipation member and at least one of a truss angle and truss thickness of the stiffening member. A finite element analysis is used to determine vibration damping data related to the damper applied to the reinforced skin structure at one or more predetermined frequencies. A vibration reduction result is calculated based upon the vibration damping data.

DETAILED DESCRIPTION

The following detailed description illustrates exemplary systems and methods, of reducing noise in a reinforced skin structure, such as an aircraft. The description enables one of ordinary skill in the art to make and use the disclosure, and includes descriptions of several exemplary embodiments. However, the disclosure is not limited to reducing noise in aircraft, but may be used to reduce noise in any structure that includes a reinforced skin structure.

Figure 1:
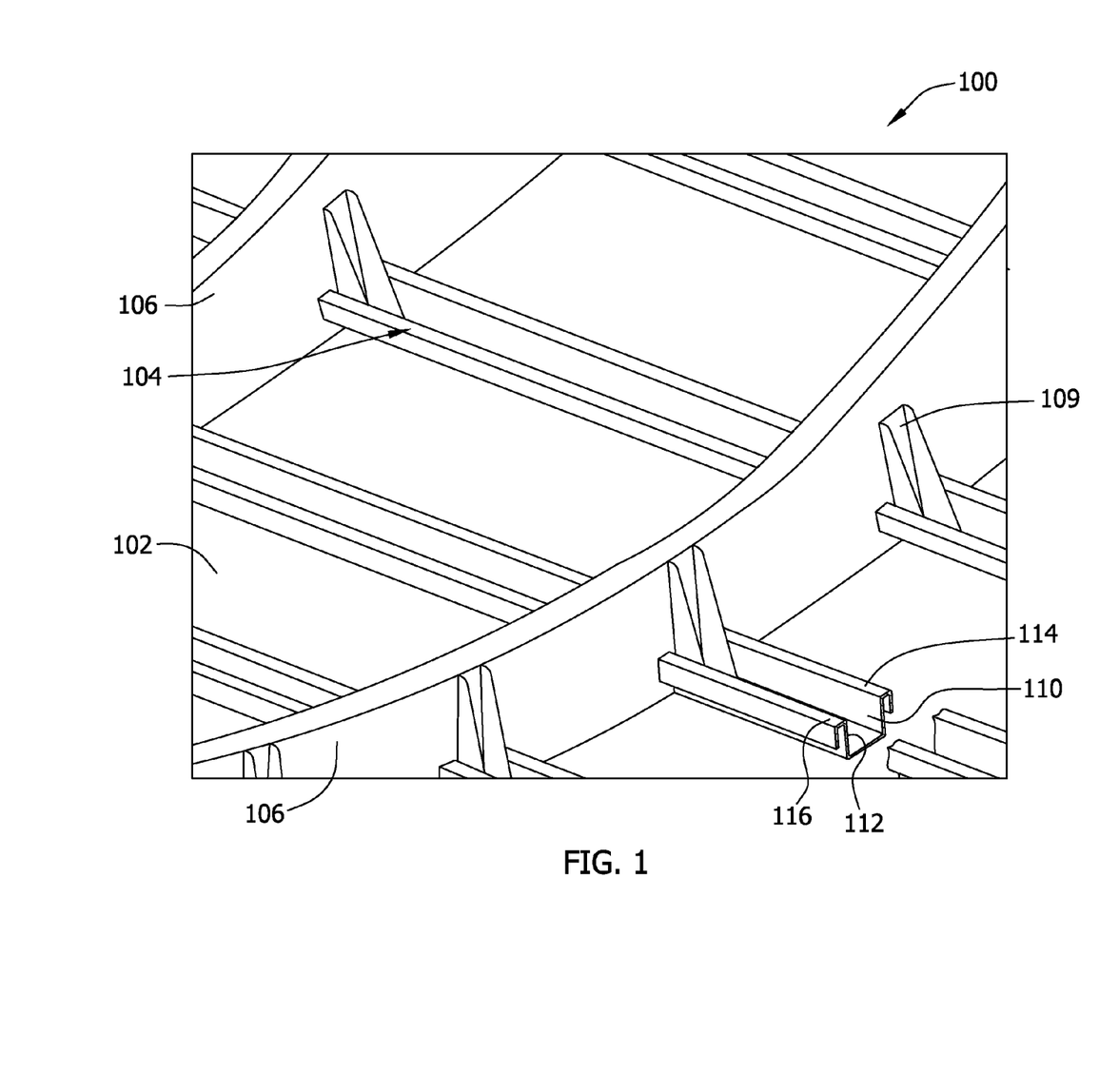
FIG. 1 is a perspective view of a portion of an exemplary reinforced skin structure.

FIG. 1 is a perspective view of a portion of an exemplary reinforced skin structure 100. In one embodiment, reinforced skin structure 100 is an aircraft fuselage. Reinforced skin structure 100 includes an outer wall 102 (e.g., a skin), one or more support member 104, and one or more frame member 106. In the exemplary embodiment, outer wall 102 is substantially circular in cross-section and extends at least partially circumferentially about frame member 106. Support member 104 (also referred to herein as a stringer) is mechanically coupled to outer wall 102 and extends between outer wall 102 and frame member 106 to provide support for reinforced skin structure 100. In another embodiment, support member 104 is coupled to one or more of outer wall 102 and frame member 106 by one or more stringer clips 109. In the exemplary embodiment, support member 104 has a hat cross-sectional structure that is substantially U-shaped. In the exemplary embodiment, support member 104 includes a cross-member 108 (shown in FIG. 2) that extends between a first leg member 110 and an opposing leg member, the opposing leg member being second leg member 112, as shown in the cut-away view of one support member 104. Support member 104 also includes a first flange 114 and a second flange 116 that extend substantially perpendicularly outwardly from the first leg member 110 and the second leg member 112, respectively. In one embodiment, cross-member 108 is coupled to outer wall 102. First leg member 110 and second leg member 112 extend substantially perpendicularly from opposite ends of cross-member 108 thereby defining the U-shape of support member 104. In one embodiment, cross-member 108 and first leg member 110 and second leg member 112 are sized to support a predetermined induced loading on outer wall 102, for example due to pressurization of the outer wall 102. In the exemplary embodiment, reinforced skin structure 100 includes a plurality of support member 104 spaced apart and substantially parallel to one another and coupled to outer wall 102. Although support member 104 is shown in FIG. 1 as being U-shaped, in other embodiments, support member 104 has any cross-sectional shape that enables support member 104 to function as described herein, such as, for example a C-shape, an I-shape, an L-shape, a T-shape, an H-shape a Z-shape and the like.

Figure 2:
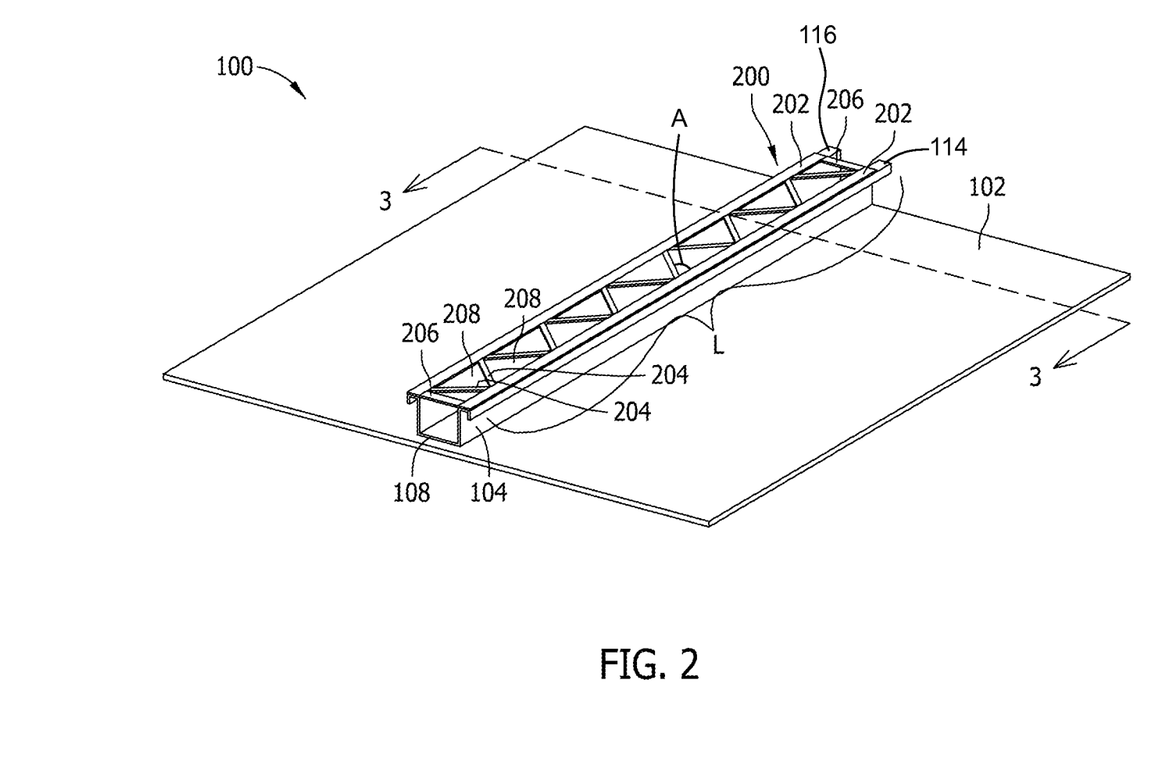
FIG. 2 is a perspective view of the reinforced skin structure shown in FIG. 1, and including an exemplary damping apparatus.

FIG. 2 is a perspective view of a portion of reinforced skin structure 100, including an exemplary vibration damping apparatus including a stiffening member 200. In the exemplary embodiment, stiffening member 200 is positioned on flanges 114 and 116 of support member 104. Stiffening member 200 includes at least two elongated members 202 extending parallel to a longitudinal length of support member 104, and at least one truss member 204 extending obliquely at an angle A (i.e., at a non-perpendicular angle) between elongated members 202. In another embodiment, stiffening member 200 includes one or more end members 206 extending substantially perpendicularly from each end of elongated members 202. Stiffening member 200 is configured to increase the rigidity of support member 104 to tune or adjust the resonant frequency of the support member 104 by constraining the bending and torsional twisting modes of the support member 104 at one or more predetermined frequencies.

Elongated members 202 are spaced apart and are substantially parallel to each other. In the exemplary embodiment, elongated members 202 are coupled to first and second flanges 114 and 116 of support member 104. Elongated members 202 may be coupled to first and second flanges 114 and 116 by adhesives, fasteners, welding and the like or combinations thereof. Elongated members 202 are coupled to any part of support member 104 that enables stiffening member 200 to function as described herein, such as between outer wall 102 and support member 104 or on one of first leg member 110 or second leg member 112. In the exemplary embodiment, stiffening member 200 is extends along an entire length L of a surface of support member 104. In one embodiment, elongated members 202 are each fabricated from a single piece of material that extends the entire longitudinal length L of support member 104. In other embodiments, elongated members 202 may be fabricated from multiple pieces of material and coupled together by welding or other similar coupling methods.

In the exemplary embodiment, truss members 204 extend obliquely between adjacent elongated members at an angle A. In one embodiment, truss members 204 extend between adjacent elongated members in an alternating angular pattern such that truss members 204 define a plurality of triangular-shaped apertures 208. In one embodiment, the plurality of triangular-shaped apertures 208 are equilateral triangular-shaped apertures. In another embodiment, elongated members 202 and truss members 204 are integrally formed from a single sheet of material by cutting out one or more triangular-shaped apertures 208. The size, thickness, material and angle A of truss members 204 is configured to increase the torsional stiffness of support member 104 at one or more predefined frequencies. In one embodiment, the predefined frequencies are mid-level frequencies between 200-600 Hz, and preferably between 315-500 Hz. In the exemplary embodiment, elongated members 202 and truss members 204 each have a thickness T of from about 0.03 inches to about 0.15 inches. Truss members 204 and elongated members 202 may have the same or different thicknesses. Truss members 204 facilitate tuning of a resonant frequency of support member 104, such that for example cabin noise levels may be reduced by up to an additional 2 dB(A) as compared to at least some known stiffening members.

The triangular-shaped apertures 208 defined between truss members 204 and elongated members 202 may also enable visual inspection of cross-member 108 and interior surfaces of first leg member 110 and an opposing second leg member 112, for example for corrosion inspections of support member 104.

In the exemplary embodiment, stiffening member 200 is fabricated from a single piece of material and spans the entire length L of support member 104. In alternative embodiments, the length L of stiffening member 200 may be changed to be shorter than the entire longitudinal length of support member 104 to facilitate reducing an overall weight of the reinforced skin structure or for tuning a resonant frequency of support member 104 or the like. Moreover, in other embodiments, one or more stiffening member 200 may be coupled to all, or more than one support member 104, or stiffening member 200 may be coupled to only a portion of support member 104 of reinforced skin structure 100.

Stiffening member 200 may be installed initially during manufacturing of a new structure, such as a new aircraft, or retrofit to an existing reinforced skin structure 100. Although stiffening member 200 may be described herein in the context of an aircraft fuselage, stiffening member 200 is not limited to this particular use. Accordingly, stiffening member 200 may be used in other embodiments, including any other vehicles having a reinforced skin structure.

Stiffening member 200 may be manufactured from a plurality of different materials, including metals, metal alloys, fiberglass, plastic, composites or the like and combinations thereof. In some embodiments, stiffening member 200 is fabricated from one or more of aluminum, steel, titanium, and the like or combinations thereof. In another embodiment, composite materials are used to fabricate stiffening member 200, which include graphite and polyarimide fibers displaced in a matrix of epoxy or other resin where inner laminar ply orientations are optimized for sufficient stiffness specific to a stringer location. In one embodiment, stiffening member 200 is fabricated from the same material as outer wall 102 or support member 104 to substantially prevent electrical charging and/or corrosion between stiffening member 200, support member 104, and/or outer wall 102. For example, in the exemplary embodiment, stiffening member 200, outer wall 102 and support member 104 are each fabricated from aluminum.

Figure 3:
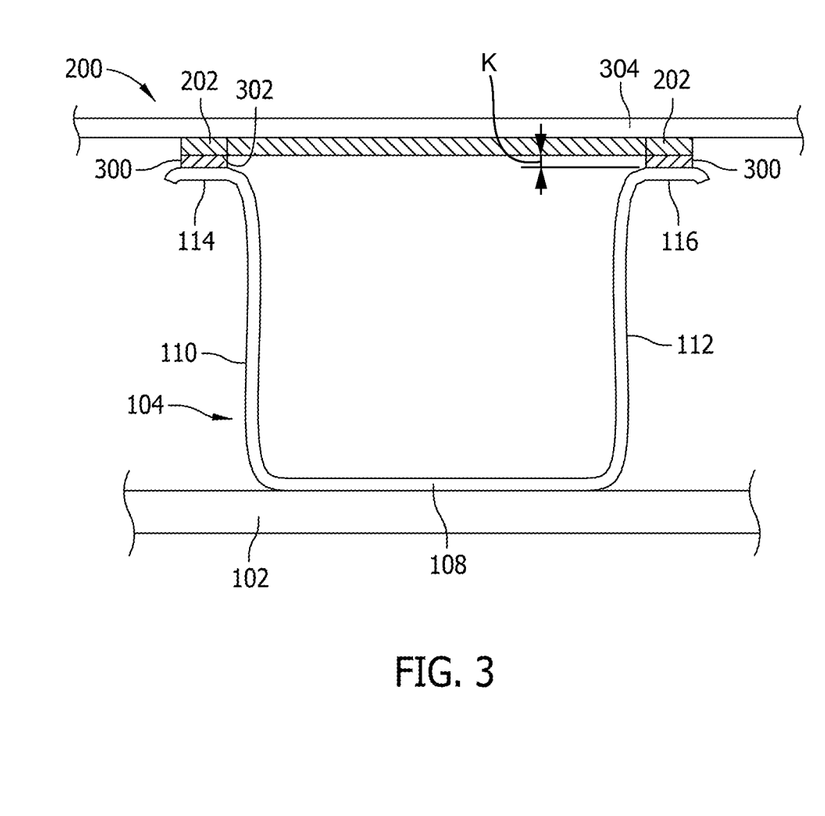
FIG. 3 is a cross-sectional view of the damping apparatus shown in FIG. 2.

FIG. 3 is a cross-sectional view of stiffening member 200 taken along line 3-3 (shown in FIG. 2). In the exemplary embodiment, stiffening member 200 is coupled to an energy dissipation member 300. In the exemplary embodiment, energy dissipation member 300 is a viscoelastic material member suitable for reducing vibration by converting vibrational energy to heat. In one embodiment, energy dissipation member 300 includes a self-adhesive material that is configured to adhere to at least one surface 302 of each of elongated members 202. In one embodiment, energy dissipation member 300 is formed with a thickness K of from about 0.005 inches to about 0.02 inches. In one embodiment, energy dissipation member 300 extends substantially continuously across the entire length L of at least one surface 302 of elongated members 202. In some embodiments, energy dissipation member may be fabricated from acrylic, urethane, silicon, rubber and the like, or combinations thereof. In another embodiment, an inner wall 304 may be positioned adjacent to stiffening member 200.

In one embodiment, reinforced skin structure 100 is a fuselage of an aircraft. In operation of this embodiment, the reinforced skin structure 100 (shown in FIG. 1) may be pressurized when flown at high altitudes, such as, for example 5,000 feet above sea level or more. When pressurized, first bending and torsional twisting modes of support member 104 (shown in FIG. 1) may be excited by vibration induced by the engines, wind effects or the like, resulting in increased noise and vibrations being transmitted from the reinforced skin structure 100 (i.e., the fuselage) to an interior cabin of the aircraft (not shown). One or more of stiffening member 200 and energy dissipation member 300 may be configured to adjust a resonant frequency of support member 104 to above or below mid-frequencies and thus, lower cabin noise. In another embodiment, one or more of stiffening member 200 and energy dissipation member 300 are configured to dampen the vibration induced noise by dissipating the vibrational energy imparted from support member 104 as heat. In another embodiment, stiffening member 200 stiffens one or more of the first bending and torsional twisting modes of support member 104.

In one embodiment, stiffening member 200 and energy dissipation member 300 are configured to substantially dampen mid-level frequencies of 200-600 Hz by adjusting the resonant frequency of support member 104 to be outside mid-level frequency range and/or by substantially dissipating vibrational energy at 200-600 Hz by converting the vibrational energy to heat in energy dissipation member 300. In one preferred embodiment, stiffening member 200 and energy dissipation member 300 are configured to reduce noise in the range of 315 to 500 Hz.

In another embodiment, triangular-shaped apertures 208 (shown in FIG. 2) of stiffening member 200 enable visual corrosion inspection of support member 104 therethrough, which allows in one embodiment that the coverage area of stiffening member 200 on support member 104 be complete along length L. Such coverage area, which may be increased as compared to full-hat dampers, facilitates an increased vibration dissipation, as more complete coverage of support member 104 by stiffening member 200 can be accomplished and still provide the necessary corrosion inspection capability. Moreover, the configuration of stiffening member 200 including triangular-shaped apertures 208 may reduce the weight of stiffening member 200, while maintaining a desired stiffness, thereby, facilitating increased efficiency of aircraft operation. In other embodiments, vibrational energy constrained by stiffening member 200 is transferred via coupling of elongated members 202 to support member 104 through energy dissipation member 300, which disperses the vibrational energy as heat to achieve the desired damping effect.

In one embodiment, triangular-shaped apertures 208 occupy approximately 40%-60% of the surface area of the stiffening member 200. As such, stiffening member 200 may weigh approximately 40%-60% less than a full-hat damper of the same size, yet provide equivalent vibration damping performance.

Figure 4:
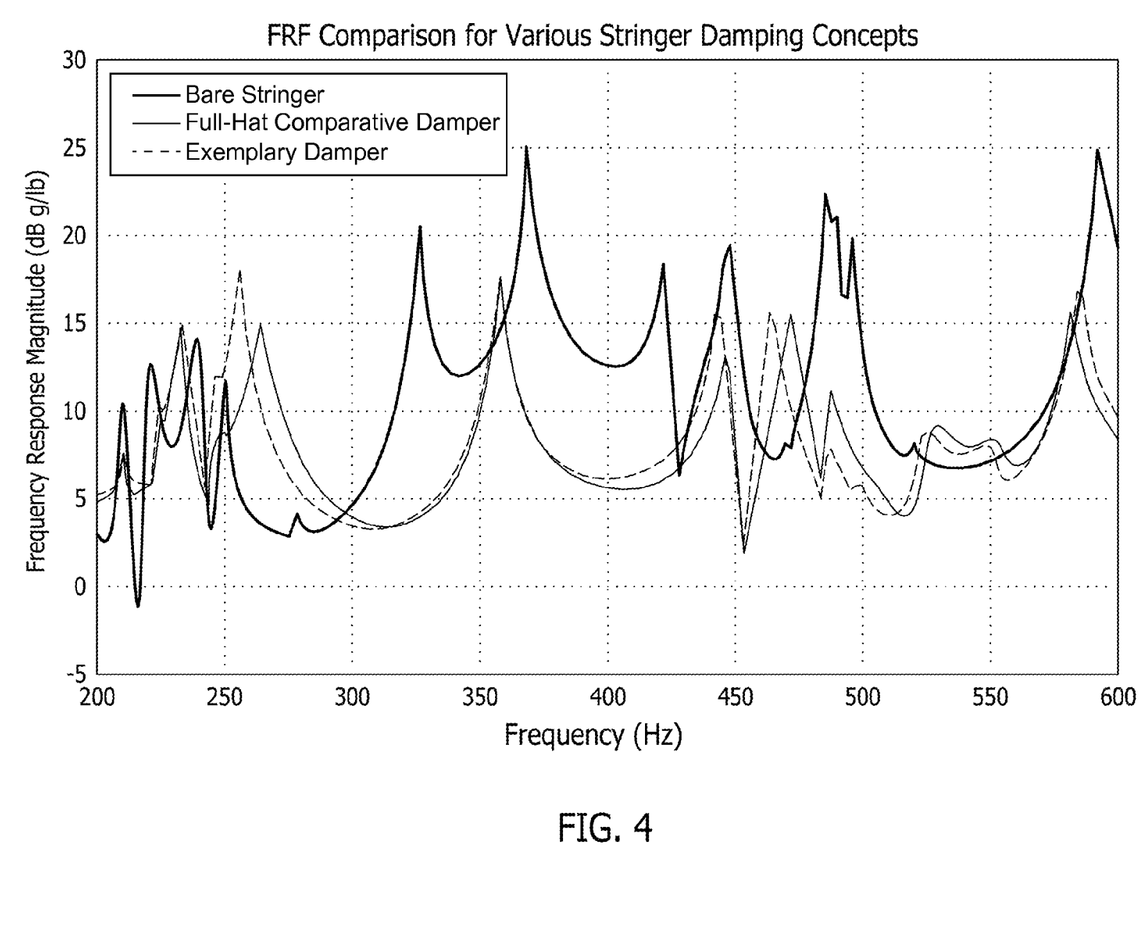
FIG. 4 is a graph plotting exemplary noise levels of a support member with the damping apparatus shown in FIG. 3, an exemplary un-damped support member, and an exemplary support member including a comparative example full-hat stiffening member.

FIG. 4 is a graph plotting a frequency response magnitude on the vertical axis and a frequency on the horizontal axis of exemplary vibration levels generated in an exemplary stringer, including a stiffening member 200, a comparative un-damped bare stringer, and a comparative stringer including a full-hat stiffening member, over mid-frequency ranges of about 200-600 Hz in an aircraft cabin. As shown in FIG. 4, the frequency response magnitude of the stringer including exemplary stiffening member 200 is on average lower than the comparative bare stringer. At certain frequencies, such as at about 260-280 Hz and 470-500 Hz, the vibration level of the stringer with stiffening member 200 is about 2 dB(A) lower than the vibration level of the stringer with the comparative full-hat stiffening member. Further, the stringer with the stiffening member 200 has a reduced weight as compared to the stringer including the full-hat damper. Thus, the stiffening member 200 may reduce noise as well as, or better than, the full-hat damper but at a reduced weight and provides the ability for corrosion inspection of the support member 104 through triangular-shaped apertures 208.

The systems, methods, and apparatus described herein facilitate reducing noise and vibration in a reinforced skin structure by about 2 dB(A) in mid-frequency ranges of about 200-600 Hz as compared to comparative stiffening members. Moreover, when the exemplary stiffening member is fabricated from aluminum, the total weight of the reinforced skin structure may be reduced, while retaining a desirable stiffness, as compared to fuselages using known damping devices fabricated from other material. The reduced weight facilitates increasing fuel and power efficiency. In addition to the noise reduction, vibration reduction, and weight reduction, the apparatus described herein may also facilitate corrosion inspections of fuselage stringers without having to uninstall or remove the damping apparatus.

In another embodiment, a method of determining vibration damping characteristics of the reinforced skin structure 100 are determined using a computer model. In this embodiment, the stiffening member 200 and the energy dissipation member 300 are modeling, for example using a finite element model (FEM). The model may include data parameters of the stiffening member including a truss member angle A and a truss member thickness. Additional energy dissipation member 300 parameters, such as stiffness, loss factor and thickness may be included in the model. In a preferred embodiment, an ambient temperature is included in the model. As used herein, the term "loss factor" relates to an amount of energy dissipated by the energy dissipation member in one vibration cycle. A finite element analysis is conducted to determine the vibration damping characteristics of the modeled stiffening member 200 and the energy dissipation member 300 at one or more particular frequencies, such as about 315 Hz, 400 Hz and 500 Hz. In a preferred embodiment, the reinforced skin structure 100 is modeled as an aircraft fuselage, and the model includes data parameters related to pressurization values of the fuselage.

After the vibration damping characteristics are determined using the finite element analysis, such characteristics may be entered into a cabin noise model to determine a noise reduction amount in an interior region of the reinforced skin structure, for example an aircraft interior cabin. One or more of the parameters may be varied or adjusted and the model can be re-run to obtain a varied vibration reduction result to determine effects of the changed parameters, such as a varied vibration. As such, a user may optimize one or more of the parameters to maximize a noise reduction amount at a particular frequency, or range of frequencies. In one embodiment, the finite element analysis is utilized to customize the damping characteristics based upon a particular operating environment of the reinforced skin structure 100, such operating environments including one or more of an ambient temperature, pressure and the like.

Exemplary embodiments of the systems, methods, and an apparatus for reducing noise in fuselages are described above in detail. The systems, methods, and apparatus are not limited to the specific embodiments described herein, but rather, components of the systems and apparatus, and/or steps of the methods may be utilized independently and separately from other components and/or steps described herein. For example, the methods may also be used in combination with other noise damping systems, methods, and apparatuses, and are not limited to practice with only the systems, methods, and apparatus as described herein. Rather, the exemplary embodiment can be implemented and utilized in connection with many other noise damping applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any apparatuses or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for damping vibrational energy induced to a reinforced skin structure, wherein the reinforced skin structure includes an outer wall and at least one stringer coupled to the outer wall and having a length that extends between a pair of adjacent frame members, said method comprising:
attaching a damping apparatus to the at least one stringer, the damping apparatus configured to dampen vibration of the at least one stringer, wherein the damping apparatus includes a stiffening member configured to adjust at least one of a bending mode and a torsional twisting mode of the stringer and an energy dissipation member configured to dissipate vibrational energy of the stringer, the stiffening member including at least two elongated members that are spaced a distance apart, and that are oriented substantially parallel to one another, wherein the stiffening member further includes at least one truss member that extends obliquely between the at least two elongated members; and
orienting the damping apparatus such that the at least two elongated members extend the length of the at least one stringer and such that the torsional twisting mode of the at least one stringer is adjusted.

2. A method in accordance with claim 1, wherein the energy dissipation member includes a viscoelastic material member.

3. A method in accordance with claim 1, further comprising:

disposing the energy dissipation member on at least one surface of each of the at least two elongated members; and attaching the at least two elongated members to the at least one stringer such that the energy dissipation member is positioned between the at least two elongated members and the stringer.

4. A method in accordance with claim 3, further comprising disposing the energy dissipation member substantially continuously across an entire length of at least one surface of each of the at least two elongated members.

5. A method in accordance with claim 1, further comprising providing the damping apparatus substantially continuously across an entire length of the at least one stringer.

6. A method in accordance with claim 1, wherein the at least one truss member defines a plurality of equilateral triangular-shaped apertures between the at least two elongated members.

7. A reinforced skin structure comprising:
an outer wall;
a pair of adjacent frame members coupled to said outer wall;
at least one stringer coupled to said outer wall and having a length extending between said pair of adjacent frame members; and
a vibration damping apparatus coupled to said stringer, said vibration damping apparatus comprising:
a stiffening member configured to adjust at least one of a bending mode and a torsional twisting mode of said stringer and extending along at least a portion of said at least one stringer, said stiffening member comprising at least two elongated members spaced a distance apart, extending the length of the at least one stringer such that the torsional twisting mode is adjusted, and oriented substantially parallel to one another and at least one truss member extending obliquely between said at least two elongated members; and
an energy dissipation member coupled to said stiffening member, said energy dissipation member configured to dissipate vibrational energy of the stringer.

8. A reinforced skin structure in accordance with claim 7, wherein said energy dissipation member comprises a viscoelastic material member on at least one surface of each of said at least two elongated members.

9. A reinforced skin structure in accordance with claim 7, wherein said energy dissipation member has a thickness between about 0.005 inches and about 0.02 inches.

10. A reinforced skin structure in accordance with claim 7, wherein said energy dissipation member extends substantially continuously across an entire length of at least one surface of each of said two elongated members.

11. A reinforced skin structure in accordance with claim 7, wherein each of said at least two elongated members extends substantially continuously across an entire length of said at least one stringer.

12. A reinforced skin structure in accordance with claim 7, wherein said at least one stringer comprises:

a cross-member for coupling said at least one stringer to said outer wall;
a first leg member and an opposing second leg member, each of said leg members extending substantially perpendicularly from opposite ends of said cross-member; and
a first flange and a second flange, said first flange extending substantially perpendicularly from said first leg member, said second flange extending substantially perpendicularly from said second leg member.

13. A reinforced skin structure in accordance with claim 12, wherein said at least two elongated members are coupled to each of said first and second flanges.

14. A reinforced skin structure in accordance with claim 7, wherein said at least one truss member defines a plurality of triangular-shaped apertures between said at least two elongated members.

15. An apparatus for damping vibrational energy of a reinforced skin structure that includes an outer wall and, a pair of adjacent frame members coupled to the outer wall, and at least one stringer coupled to the outer wall and having a length extending between the pair of adjacent frame members, said apparatus comprising:
a stiffening member configured to adjust at least one of a bending mode and a torsional twisting mode of a reinforced skin structure, said stiffening member comprising:
at least two elongated members spaced a distance apart, each sized to extend the length of the at least one stringer such that the torsional twisting mode is adjusted, and oriented substantially parallel to one another; and
at least one truss member extending obliquely between said at least two elongated members; and
an energy dissipation member coupled to said stiffening member, said energy dissipation member configured to dissipate vibrational energy of the reinforced skin structure.

16. An apparatus in accordance with claim 15, wherein said energy dissipation member comprises a viscoelastic material member on at least one surface of each of said at least two elongated members.

17. An apparatus in accordance with claim 15, wherein said energy dissipation member extends substantially continuously across an entire length of at least one surface of each of said two elongated members.

18. An apparatus in accordance with claim 15, wherein said energy dissipation member comprises one of acrylic, urethane, and silicon.

19. An apparatus in accordance with claim 15, wherein said energy dissipation member has a thickness between 0.005 inches and 0.02 inches.

20. An apparatus in accordance with claim 15, wherein said vibration damping apparatus comprises one or more of aluminum, steel, titanium, and graphite.

* * * * *